United States Patent [19]

Bechthold et al.

[11] Patent Number: 4,541,999

[45] Date of Patent: Sep. 17, 1985

[54] METHOD FOR REMOVING ACIDIC COMPONENTS INCLUDING NITROGEN OXIDE FROM WASTE GASES

[75] Inventors: Horst Bechthold, Erftstadt-Friesheim; Heinz J. Fischer, Neunkirchen-Seelscheid; Wolfgang Schulte, Monheim, all of Fed. Rep. of Germany

[73] Assignee: Backau-Walther Aktiengesellschaft, Grevenbroich, Fed. Rep. of Germany

[21] Appl. No.: 498,487

[22] Filed: May 26, 1983

[30] Foreign Application Priority Data

May 29, 1982 [DE] Fed. Rep. of Germany ....... 3220403

[51] Int. Cl.$^4$ .................... C01B 21/00; C01B 17/00; C01B 21/48; C01C 1/24
[52] U.S. Cl. .................... 423/235; 423/242; 423/395; 423/396; 423/545; 71/57; 71/58; 71/60
[58] Field of Search .......... 423/235, 395, 396, 235 D, 423/242 A, 242 R, 545; 71/57, 58, 60

[56] References Cited

U.S. PATENT DOCUMENTS

| | | | |
|---|---|---|---|
| 3,453,071 | 7/1969 | Schmitt et al. | 423/235 |
| 4,029,739 | 6/1977 | Senjo et al. | 423/235 |
| 4,035,470 | 7/1977 | Senjo et al. | 423/235 |
| 4,276,276 | 6/1981 | Van Hook et al. | 423/235 |

FOREIGN PATENT DOCUMENTS

| | | |
|---|---|---|
| 2520540 | 11/1975 | Fed. Rep. of Germany . |
| 2532471 | 1/1976 | Fed. Rep. of Germany . |
| 2518386 | 4/1976 | Fed. Rep. of Germany . |

*Primary Examiner*—Gregory A. Heller
*Attorney, Agent, or Firm*—Peter K. Kontler

[57] ABSTRACT

A method of simultaneously removing $SO_x$ and $NO_x$ from waste gases. Using a known desulfurization process the waste gases free of the acidic components are contacted with an oxidizing agent in the gas phase for the oxidation of the oxygen of nitrogen contained in the waste gases. The formed $NO_2$ is absorbed in a subsequent absorbing stage under previous addition of $NH_3$ and the thereby obtained absorbing product is oxidized to form ammonium nitrate in a subsequent oxidation stage with atmospheric oxygen and then reconveyed into the desulfurization process.

14 Claims, 1 Drawing Figure

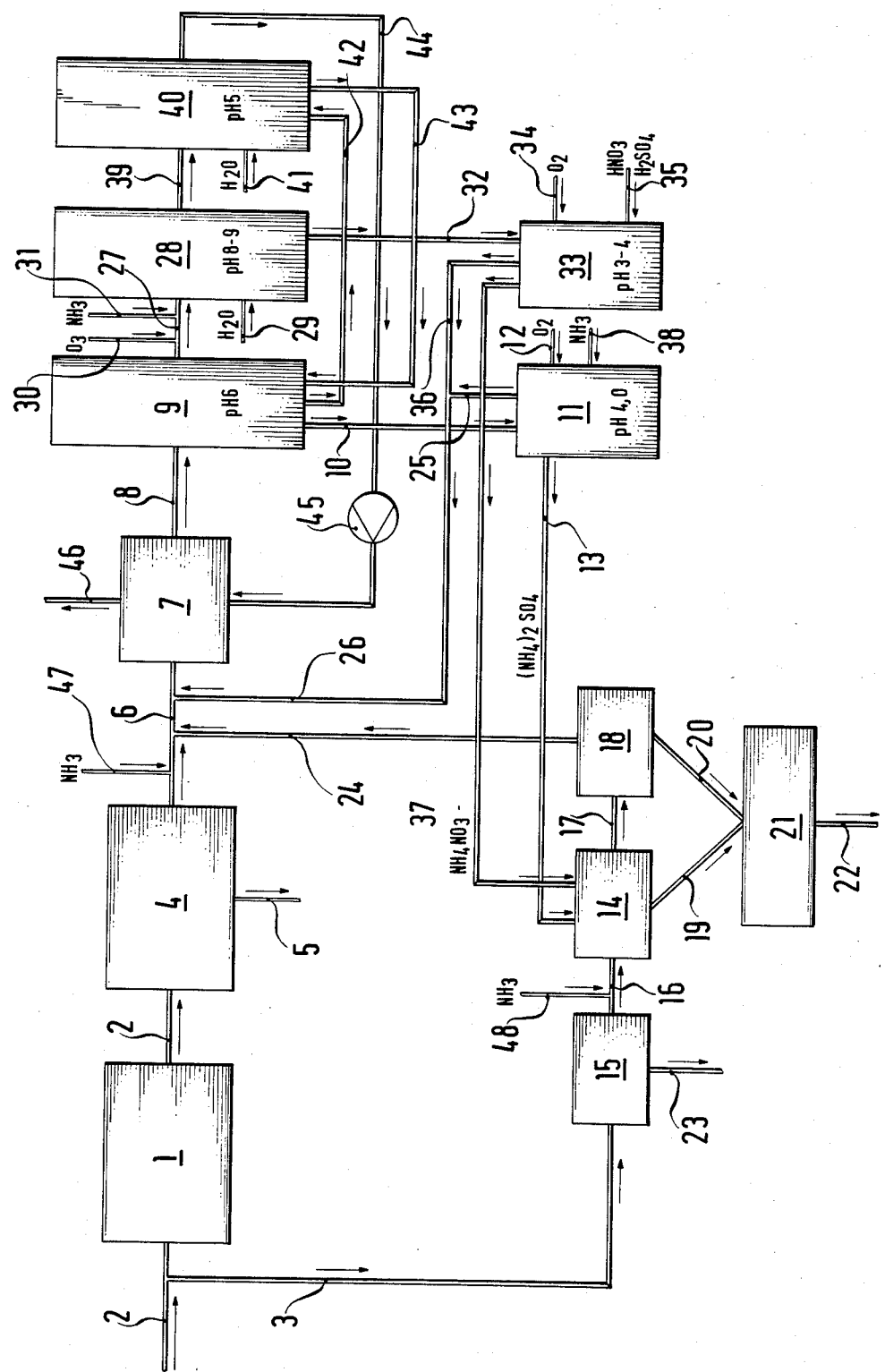

METHOD FOR REMOVING ACIDIC COMPONENTS INCLUDING NITROGEN OXIDE FROM WASTE GASES

BACKGROUND OF THE INVENTION

The present invention relates generally to a method of removing acidic components including, but not limited to, nitrogen oxide from waste gases and, more particularly, to such a method which may be used in conjunction with a power plant heated by coal wherein the waste gases, free of acidic components, are contacted in a gas phase with an oxidizing agent for the oxidation of oxides of nitrogen contained in the waste gases. The oxidizing agent subsequently absorbs the formed $NO_2$ in an absorbing stage after addition of $NH_3$. The thereby formed absorbing product is then oxidized with atmospheric oxygen to form ammonium nitrate in a subsequent oxidation stage and then, as a solution, is admitted to the evaporator.

The subject invention is an extension of current state of the art methods as described, for example, in West German Pat. No. DE-PS 25 18 386. In accordance with this prior art method, economical waste gas purification is conducted in a relatively simple manner wherein a dried salt is obtained while removing $SO_2$ from the waste gases. This salt, which may be ammonium sulfate, may be used as fertilizer. Mud or other waste water problems which deleteriously affect the environment are therefore eliminated.

During combustion, waste gases from the furnaces are admitted in different concentrations in accordance with the types of furnaces, the types of boiler, sizes of boiler and the types of fuel used, etc. Generally speaking, the total $NO_x$ concentration may be between 200 and 2000 mg/Nm$^3$. $NO_x$ is reduced to $N_2$, which is removed with the waste gases free of $SO_x$ via a waste gas flue.

It is well known in the prior art as exemplified, for example, in West German patent application No. DE-PS 25 20 540, to remove $NO_x$ together with $SO_x$ from combustion waste gases. During desulfurization, the waste gases are washed with a solution containing ammonium sulfite which may afterwards be regenerated and reacted with coal gas containing $NH_3$. In order to remove the $NO_x$, the desulfurized waste gas is heated to a temperature between about 200° C. and about 450° C. and then passed over a catalytic agent bed which catalyzes the reaction of $NO_x$ with $N_3$ to $N_2$. During this procedure, additional energy is required for the reduction reaction. Furthermore, expensive catalytic agents must be used to eliminate potential environmental problems thus resulting in an expensive regeneration plant.

Another method of removing oxides of nitrates and sulfur oxides, from waste gases is described, for example, in West German patent application No. DE-OS 25 32 471 wherein the temperature of the $NO_x$-containing waste gas is maintained above about 700° C. The reaction occurs in the presence of ammonia and oxygen which thereby avoids the need for the use of a catalytic agent. This method is intended to avoid the formation of salts so that the walls of the air heater do not pollute the pipelines in the combustion furnace. In this procedure, no catalytic agent is used and no usable salt is obtained as an end product.

In accordance with the foregoing background, it is a primary object of the subject invention to provide a method of desulfurizing waste gases during combustion reactions.

It is a further object of the subject invention to provide a method wherein dried ammonium sulfate is obtained as a fertilizer during said desulfurization process.

It is still a further object of the subject invention to provide such a method wherein the $NO_2$ contained in the waste gas is simultaneously removed to such an extent that a mixed commercial fertilizer consisting of ammonium sulfate and ammonium nitrate is obtained.

It is yet still a further object of the present invention to provide such a method wherein the mixing proportions of the two components may be adjusted to meet market demand.

SUMMARY OF THE INVENTION

The present invention, in brief summary, relates to a method of simultaneously removing $SO_x$ and $NO_x$ from waste gases. Commencing from a known desulfurization process, the waste gases free of acidic components are contacted with an oxidizing agent in a gas phase for the oxidation of the nitrogen oxides contained in the waste gases. The formed $NO_2$ is absorbed during a subsequent absorbing stage after addition of the $NH_3$ and the thereby obtained absorbing product is oxidized to form ammonium nitrate in a subsequent oxidation step with atmospheric oxygen. The ammonium nitrate is then reconveyed back into the desulfurization process.

It will be appreciated that the present method solves many of the problems experienced in the prior art. The waste gases, which are free of the acidic components, exist in the gas phase when they are contacted with an oxidizing agent for oxildation of the nitrogen oxdes contained therein. The formed $NO_2$ is absorbed in subsequent absorbing stages after previous addition of $NH_3$. The absorbing product resulting therefrom is subsequently oxidized with atmospheric oxygen in an oxidizing stage to form ammonium nitrate prior to admission as a solution in the evaporator.

For the $SO_2$ extraction, waste gases are removed using an electro filter of the power plant and then mixed with the required ammonia amount in an amount slightly less than the stoichiometrically required amount at temperatures of between about 100° C. and about 180° C. After passing through the regenerative heat exchanger, the waste gases reach the absorbing stage for desulfurization at a temperature of between about 40° C. and about 70° C. during which the $SO_2$ is washed out. Due to the precisely obtained lack of ammonia, a wash solution containing ammonium sulfite, ammonium hydrogen sulfite and ammonium sulfate as well as small amounts of ammonium chloride and ammonium fluoride results. The pH of the wash solution is about 6.0.

The waste gases leaving the absorbing stage for desulfurization contain residues of $SO_2$ and $NH_3$ as well as $NO$ and $NO_2$ and $CO_2$, $O_2$, $N_2$ and steam. The waste gases are then mixed with stoichiometric amounts of ozone and ammonia required for the desired NO separation and guided over the second absorbing stage.

The $O_3$ added in the gas phase causes an oxidation of from $NO_x$ to $NO_2$ which may be washed out using the simplest means at low temperatures after adding $NH_3$ in the second absorbing stage. During the oxidation of $NO_x$ in the gas phase, the following reaction takes place:

$$NO + O_3 \rightarrow NO_2 + O_2$$

Thereby an equilibrium which exists between ammonium nitrite and ammonium nitrate results in the absorbing stage after the following reaction:

$$2NO_2 + 2NH_3 + H_2O \rightarrow NH_4NO_2 + NH_4NO_3$$

The carbonate formed in the second absorbing stage decomposes in the second oxidation container to $CO_2$, which is consequently only conducted in the cycle. The equation is as follows:

$$(NH_4)_2CO_3 \rightarrow CO_2 + 2NH_3 + H_2O$$

In the second absorbing stage, the pH is maintained between about 5.0 and about 10.0 and preferably between about 8.0 and about 9.0 for the preferred $NO_x$ removal. In this way, the $NO_2$, formed from NO through oxidation with ozone, is washed out in the desired variable percentages. Residue $SO_2$ from the first absorbing stage for the desulfurization is, due to the high pH, almost completely removed. As the pH is maintained between about 8.0 and about 9.0, the $CO_2$ is washed out in this stage at the beginning of the operation of such an arrangement. After obtaining equilibrium of the solution according to the above equation and the wash solution, only minor $CO_2$ absorption occurs. Thus, the wash solution of the second absorbing stage provided by the invention contains ammonium nitrite, ammonium carbonate, ammonium nitrate, ammonium sulfite and ammonium sulfate. The gas which emerges from the second absorbing stage contains $CO_2$, $N_2$ and steam, ozone residue, $NO_2$, NO residue, $NH_3$ and traces of $SO_2$.

The solution of the second absorbing stage in accordance with the invention is admitted to another oxidizing arrangement wherein the pH is lowered to between 3.0 and 4.0 by the addition of $H_2SO_4$. The contained ammonium carbonate thereby decomposes to $NH_3$ and $CO_2$ as well as water. The gases are introduced to the inlet of the arrangement via a waste gas circuit. With assistance from atmospheric oxygen, the ammonium nitrite is thereupon transformed to ammonium nitrate at this reduced pH.

The discharges of the oxidizing arrangements after the $SO_x$ or $NO_x$ absorbing stage can be admitted separately or mixed to separate or a common spray dryer used which is operated with flue gas. The obtained powdery product contains, in addition to the separated ammonium sulfate, desired ammonium nitrate which results from absorption having occurred in the second absorbing stage in accordance with the subject method. Thereafter, the products may be separated and jointly pelletized and dried. The resultant products may be particularly well marketed in this form as a high-grade mixed commercial fertilizer. Thus, the method in accordance with the subject invention furnishes, as an end product in a known manner, an ammonium sulfate fertilizer and as supplemental procedure with simultaneous $NO_x$ removal, an ammonium nitrate from the waste gases. This fertilizer is not only a good fertilizer by itself but may be mixed in connection with ammonium sulfate due to the increased nitrogen content in comparison to normal ammonium sulfate, and has a high quality.

The gas from the second absorbing stage may be conveyed to a third absorbing stage in which the gas is sprayed with diluted wash solution which is extracted from the absorbing stage of desulfurization. This solution containing ammonium sulfite and ammonium hydrogen sulfite is capable of removing, by reduction, the ozone residue as well as the $NO_2$ part of the gas which is not washed out in the second absorbing stage. At pH's in the washer of between about 4.5 and 5.0, the $NH_3$ residues are removed from the gas as well. The reaction in this stage occurs in accordance with the following equations:

$$(NH_4)_2SO_3 + O_3 \rightarrow (NH_4)_2SO_4 + O_2$$

$$2NO_2 + 4(NH_4)_2SO_3 \rightarrow 4(NH_4)_2SO_4 + N_2$$

The gas passing the third absorbing stage results in the arrangement being practically ozone free and, in accordance with the requirements of the Environmental Protection Agency, is ammonia-free. It is thereupon reheated to a temperature of between about 80° and 120° C. by use of a regenerative heat exchanger from the power plant and thereupon guided to the flue.

In the wash solution of the last or third absorbing stage, the ammonium sulfite and ammonium hydrogen sulfite is practically oxidized to sulfate by the reduction of the ozone to oxygen and the reduction of $NO_2$ to $N_2$. This oxidized solution is thereupon admitted to the first stage. The subsequent treatment of the wash solution from the first and second absorbing stages occurs in separate oxidizing arrangements. The solution from the first absorbing stage, to which the solution of the third stage has already been added, is conveyed to the first oxidizing arrangement belonging to the flue-gas-desulfurization method in which, with atmospheric oxygen and by the addition of ammonia, sulfites and hydrogen sulfites, are oxidized to ammonium sulfate.

The water balance of the entire arrangement is obtained from dilution of the fluid which is guided from the first absorbing stage to the third absorbing stage as well as from the addition of water in the second absorbing stage.

BRIEF DESCRIPTION OF THE DRAWING

The FIG. 1 schematically illustrates the method of the subject invention.

DETAILED DESCRIPTION OF THE INVENTION

As shown schematically in the figure, approximately 90% of waste gases from a conventional furnace are introduced into circuit 2 using an air heater 1. A preferred air heater is a Luvo air heater 1. The remaining approximately 10% of the waste gases is removed from the furnace through circuit 3. The waste gases introduced in main circuit 2 are introduced first into an electro filter 4 in which any dust is removed therefrom and then withdrawn through outlet 5. The dust-free waste gases then pass through conduit 6 to a heat exchanger 7 and then through conduit 8 to a gas washer 9 for $SO_2$ absorption. An absorbant solution is introduced into gas washer 9 and is extracted at the bottom thereof. The absorbant solution is concentrated as a salt solution, one part of which is introduced into an oxidation container 11 by return conduit 10. Through an air supply 12, fresh air is admitted to oxidation container 11 while exhaust air is re-introduced back into conduit 6 through connecting conduits 25 and 26. The oxidized salt solution is admitted to a spray dryer 14 through conduit 13.

Dust is removed from those waste gases removed from the furnace through circuit 3 by the use of a preliminary filter 15 and the dust is removed therefrom by conduit 23. Dust-free waste gases are thereupon directed through conduit 16 to the spray dryer 14 and from there into separator 18 by conduit 17 for spray-dried salts, together with salt crystals which are dried in spray dryer 14. The spray-dried salts which may be introduced as dry products are thereupon withdrawn by conduit 20. The dust residue which collects in the course of the drying process in spray dryer 14, is continuously extracted by conduit 19. A smaller amount of gas is removed from separator 18 and reconveyed back to conduit 6 by way of conduit 24. An appropriate current may be introduced into the conduit via electro filter 4. The above method conforms in general terms to the arrangement described in German Pat. No. DE-AS 29 58 526.

In accordance with the subject invention, the nitrogen oxide still remaining in the waste gas from the first $SO_2$ absorbing stage, i.e., the gas washer 9, for oxidation is contained in a conduit 27 with an oxidizing agent in its gas phase. Injector circuit 30 is provided which permits the injection of ozone in gas form into conduit 27. The thus treated waste gas is admitted to a second absorbing stage, i.e., a washer 28, with the addition of ammonia. A requisite amount of ammonia is introduced into conduit 27 or into washer 28 through injector circuit 31. The absorbant product formed in washer 28 is admitted into a second oxidation container 33 through a conduit 32. In second oxidation container 33, atmospheric oxygen is admitted through conduit 34 while sulfuric or nitric acids are admitted to the conduits 25 and 26 through conduit 36. The absorption product oxidized in the second oxidation container 33 is introduced into spray dryer 14 by conduit 37. Furthermore, through conduit 38, ammonia may be introduced to the first oxidation container 11.

The waste gas exiting the second absorbing stage through washer 28, is passed through a conduit 39 and thereupon to a third reduction stage in a washer 40 to permit the reduction of $NO_2$ remaining in the waste gases. Conduit 41 permits admission of water into washer 40 and through conduit 42. One part of the absorbant solution from the washer 9 is admitted to the washer 40 and the solution is extracted through the sump of washer 40. The absorbant product of washer 40 is removed at its sump and admitted to the sump of the washer 9 through conduit 43. The purified gases exit gas washer 40 by conduit 44 and are guided to a flue 46 by means of a blast 45 through heat exchanger 7. Two other conduits 47 and 48 are provided through which ammonia may be introduced on the one side into the conduit 6 and on the other side into conduit 16.

The resultant product exiting separator 18 through conduit 20 may be conveyed to a pelletizing device 21 and thereupon withdrawn in the form of a finished pellet at 22.

EXAMPLE

In the foregoing example, ammonia is fed into the arrangement of the method of the subject invention in such a manner that ammonium sulfate may be extracted from the washer 9 which is connected in series with oxidation container 11 and ammonium nitrate is extracted from the second washer 28 which is connected in series with oxidation container 33. These two products can be jointly treated in the spray dryer 14 and then pelletized as a mixed product in the pelletizing device 21. It is, however, possible to pelletize both products separately and to mix them together after pelletization.

In a power plant with a coal heated basin, e.g., 500/100M$^{3/H}$ waste gas having at a temperature of 120° C. is obtained. The $SO_2$ content of the gas was measured at 2000 mg per cubic meter. A reduction of the $SO_2$ content to 200 mg per cubic meter in the desulfurization installation was intended. In a subsequent step, it was intended that the NO content of the gas be reduced from 1500 mg per cubic meter to 750 mg per cubic meter. From the separated $SO_2$, an ammonium sulfate solution of approximately 5600 k per hour with a share of about $\frac{2}{3}$ of water is obtained in a subsequent oxidation step by reaction with ammonia, water and atmospheric oxygen.

In a second absorbing step, 460 k of the $NO_2$, formed in the gas phase by the addition of ozone, were absorbed and, after mixing with $NH_3$, converted to 640 k $NH_4NO_2$.

In an oxidizing arrangement connected in series with the stage, $NH_4NO_2$ is oxidized to form $NH_4NO_3$ by the use of atmospheric oxygen. Thereby, 2400 k of $NH_4NO_3$ solution with an approximate share of $\frac{2}{3}$ of water was formed from 640 k of $NH_4NO_2$. Since, in the oxidation of NO to $NO_2$, with the addition of ozone, approximately 575 k $NO_2$ is formed in the gas phase with the rest of the $NO_2$ (approximately 115 k) being reduced to $N_2$ in the third processing stage thereby leaving the arrangement with the purified gas.

It will be appreciated that the method of the subject invention may also be used in conjunction with a lime washing process instead of using ammonia. In that case, the $SO_2$ separation with the formation of sulfite/sulfate, would be possible in washer 9 as well as in the second washer 28 by the addition of ozone and calcium. The $NO_2$ separation to calcium nitrite/nitrate would also be possible. In washer 40, the reduction of the excess ozone would be possible with assistance from the use of calcium/sulfate in the washing stage 9.

Without further analysis, the foregoing will reveal the gist of present invention that others can, by applying current knowledge, readily adapted for various applications without omitting features that, from the standpoint of prior art, fairly constitute essential characteristics with a generic and specific aspects of our contribution to the art and, therefore, such adaptation should and is intended to be comprehended within the meaning and range of equivalence of the appended claims.

Wherefore we claim:

1. A method of removing acid components of waste gases which are emitted from a furnace or other combustion device and comprise oxides of sulfur and nitrogen, comprising the steps of
    (a) contacting the waste gases with a first absorbing fluid comprising $NH_3$ in a first absorbing stage to produce from the sulfur oxides a first solution which is removable from the waste gases and comprises sulfate and sulfite salts including ammonium sulfate and ammonium sulfite;
    (b) oxidizing the first solution to produce an oxidized first solution predominantly comprising sulfate salts;
    (c) contacting the waste gases, after removal of the first solution, with an oxidizing agent to produce from the oxides of nitrogen a gaseous stream containing nitrogen dioxide;
    (d) contacting the gaseous stream with a second absorbing fluid containing $NH_3$ in a second absorbing stage to produce from the nitrogen dioxide a second solution which is removable from the gaseous stream and comprises nitrate and nitrite salts including ammonium nitrate and ammonium nitrite;

(e) oxidizing the second solution to produce therefrom an oxidized second solution predominantly containing nitrate salts; and (f) wherein the oxidized solutions are dried.

2. The method according to claim 1, wherein said first and second solutions are oxidized with atmospheric oxygen.

3. The method according to claim 1, wherein said oxidizing agent is ozone.

4. The method according to claim 1, wherein the second absorbing fluid, contains sufficient ammonia to maintain a pH in the range of from about 5.0 to about 10.0 in said second absorbing stage.

5. The method according to claim 4, wherein said pH is in the range of from about 7.5 to about 9.5.

6. The method according to claim 1, further comprising the step of treating the gases remaining after removal of said second solution in a third absorbing stage to effect reduction of residual $NO_2$ therein to $N_2$.

7. The method according to claim 6, wherein said treating step comprises contacting said gases remaining after removal of said second solution in a third absorbing stage with a portion of said first solution.

8. The method according to claim 7, wherein said contacting in said third absorbing stage produces a solution which is introduced into said first absorbing stage.

9. The method according to claim 6, wherein the conditions in said third absorbing stage are maintained at a pH in the range of from about 4.5 to about 6.0.

10. The method according to claim 6, wherein the gases remaining after treatment in said third absorbing stage are thereafter admitted to a flue after passage through a heat exchanger.

11. The method according to claim 1, further comprising the steps of admixing and spray drying said oxidized solutions.

12. The method according to claim 11, further comprising the step of pelletizing said spray-dried solutions to produce a commercial fertilizer.

13. The method according to claim 1, wherein the oxidation of said second solution is conducted in the presence of sufficient acid to maintain during said oxidation a pH in the range of from about 3.0 to about 4.0.

14. The method according to claim 13, wherein said acid is selected from the group consisting of nitric acid, sulfuric acid and mixtures thereof.

* * * * *